March 21, 1933. C. L. EKSERGIAN 1,902,224
METHOD OF MAKING WHEEL HUBS
Filed June 6, 1929
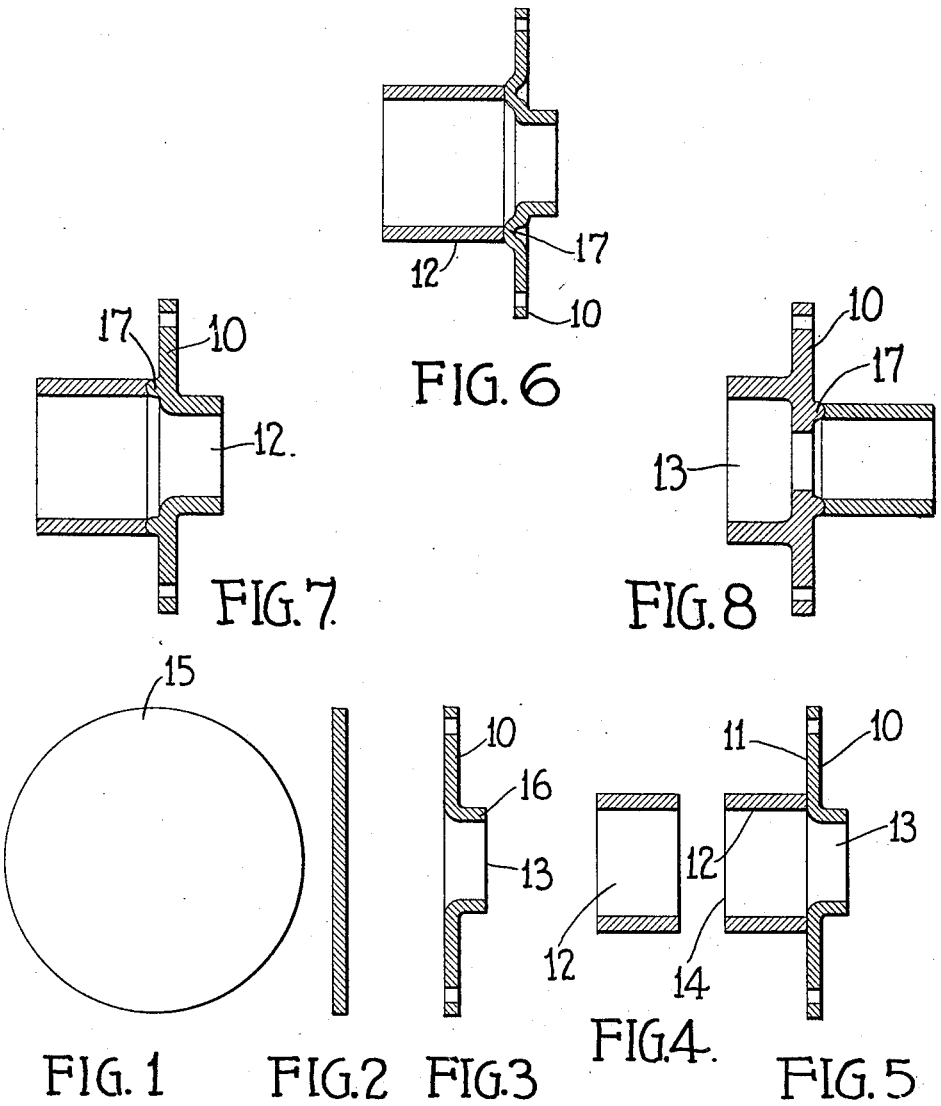
INVENTOR.
CAROLUS L. EKSERGIAN
BY
ATTORNEY.

Patented Mar. 21, 1933

1,902,224

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF MAKING WHEEL HUBS

Application filed June 6, 1929. Serial No. 368,775.

The merit of my present invention resides in the simplicity of fabrication of the component parts of the hub and the simplicity of the assembly operation. These simplicities are such as to substantially decrease the cost of production as compared with many other methods. Moreover, a hub constructed by this method has adaptabilities to certain types of vehicles and to the meeting of certain hub conditions which hubs constructed by other methods lack.

These ends I attain by dividing the flanged hub for the purposes of fabrication substantially in the plane of one face of the hub flange, constructing the barrel portion so divided in the form of a tube or ring, and butt welding the tube or ring so formed to the flange substantially in the plane of division. An important step of my invention is the providing of the flange with a projection from its face and the welding of the end of the tubular barrel portion to this projection.

Figs. 1 to 5 show one embodiment of my invention, and Fig. 6 shows the preferred embodiment.

Of these figures,

Figs. 1, and 2 and 3 are plan and axial section respectively, showing the manner of formation of the flanged section, Fig. 4 is an axial cross section of the tubular barrel portion, and Fig. 5 is an axial cross section of the assembly of the fabricated parts.

Fig. 6 shows particularly axial cross section of a hub provided with the feature of the projection, last mentioned in the preamble.

Figs. 7 and 8 are axial sections of modifications.

The radial plane of division in the one face of the radial flange 10 is designated 11. This divides from the flange 10 the barrel portion 12 for the purpose of separate fabrication. In the hub shown in Fig. 5 one end 14 of the hub is larger in diameter than the other end 13. The barrel portion 12 as divided from the flange 10 therefore would make joint therewith substantially in the radial plane of division 11.

The flange 10 I form as shown in Figs. 1 to 3, from plate stock 15 cut to the circular form of the flange and provided by integral forging or drawing operation with an axial flange 16 which is to constitute the end of the hub 13 of smaller diameter. This flange 10 and the small end of the hub 13 I may form in other ways than by die stamping, as for example, by forging or rolling, both of which processes are on occasion more economical of metal than the die stamping operation.

The barrel 12 I form from tubular stock severing therefrom a section such as shown in Fig. 4 of a length sufficient to constitute the barrel portion. This severed length I may act upon in various ways to give it interior and exterior contour and dimensions which may be desired. It is not necessary to describe these actions here since they do not constitute a part of this particular invention.

Thereupon I butt weld the end of the tubular or ring section 12 to the face of the flange 10 in the assembly shown in Fig. 5, by passing electric current between the member 12 and the flange 10 in the assembled relation shown. The principles of electric butt welding are so well known as to require no description here. If desired, however, I may weld them together in other ways, as for example, by rotary arc welding in the corners of the joint.

But the preferred form of my invention is shown in Fig. 6 in which the flange 10 is provided in the course of its fabrication with an annular projecting bead 17 juxtaposed to and within the periphery of the end of the barrel section 10. Thereupon, the end of the barrel 10 is butt welded to this projecting bead 17.

Figs. 7 and 8 are modifications in which the bead 17 is forged on to the flange 10 and the part of the barrel connected with it being a one piece forging. In Fig. 7 the part 13 of the barrel is formed integrally with flange 10 and bead 17 while in Fig. 8 it is flange 13 which is so formed. In either case the remaining section of the barrel is butt or flash welded to the bead. The shape of the bead and the abutted end of the section to be welded to it and the relative shapes are presumed to be varied in accordance with the welding conditions desired.

Each modification and application of which my invention admits without departing from its generic spirit is to be covered in the annexed claims.

What I claim is:

1. The method of making sectional flanged hubs formed from separately fabricated sections adapted to be united in substantially a radial plane, which method consists in integrally fabricating a flange portion and a portion of the barrel of the hub lying on one side thereof, forming a second unflanged barrel portion as a section of tubing, and butt welding the tubing section through one of its longitudinal extremities to the side of the flange opposite to that carrying the barrel portion.

2. The method of making sectional flanged hubs formed from separately fabricated sections adapted to be united in substantially a radial plane, which method comprises forming the barrel portion of the hub in the shape of an unflanged tube, separately forming the flange portion of the hub with a barrel portion projecting and butt welding the barrel portion directly through one of its longitudinal extremities to the face of the flange portion opposite to that face carrying the barrel portion.

3. The method of making sectional flanged hubs formed from separately fabricated sections adapted to be united in substantially a radial plane, which method comprises fabricating a flanged portion having an indented projection thereon extending from one face of the flange and on the opposite face a barrel portion, separately fabricating a second barrel portion, and welding said second barrel portion endwise to said projection.

In testimony whereof I hereunto affix my signature.

CAROLUS L. EKSERGIAN.